Patented Sept. 20, 1938

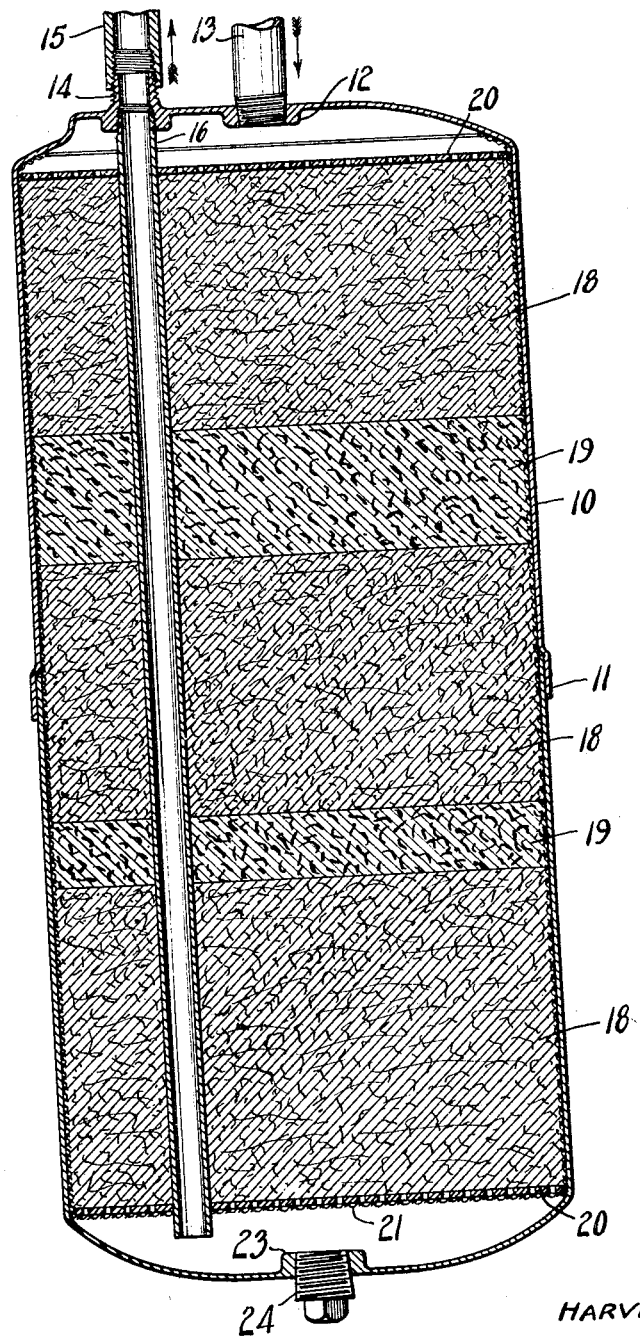

2,131,004

UNITED STATES PATENT OFFICE 2,131,004

FILTER ELEMENT AND METHOD OF MAKING THE SAME

Harvey D. Austin, Akron, Ohio, assignor to The Hamlin Metal Products Company, Akron, Ohio, a corporation of Ohio Application October 3, 1935, Serial No. 43,378

13 Claims. (Cl. 210—203)

This invention relates to filter elements and to methods of making the same, and more especially it relates to filtering elements for removing the impurities from hot oil, and to procedure for the manufacture of said elements.

The chief objects of the invention are to provide an improved oil-filtering element that will not be deleteriously affected by hot oil; that will not swell in use and thereby provide channels through which the oil may pass without adequate filtering; to provide superior filtering characteristics; and to provide an improved method for making such an element. More specifically the invention aims to provide relatively inexpensive, long staple, vegetable fibres treated to render them tough, non-elastic and non-resilient for use in oil filters. Other objects will be manifest.

The single figure of the accompanying drawing is a vertical, longitudinal sectional view of an oil filter comprising the improved filtering element, in its preferred form.

Referring to the drawing, 10 is a metal canister of generally cylindrical shape with rounded or convex end walls. The canister originally is made in two parts which are telescoped and united to each other in a medial circumferential seam 11 after the filtering elements have been assembled interiorly thereof. The inlet to the canister is axially disposed at the top thereof and may comprise an internally threaded boss 12 into which a suitable inlet pipe 13 may be threaded. The outlet of the canister is eccentrically disposed at the top thereof and comprises an externally threaded fixture 14 to which an outlet pipe 15 may be attached. The fixture 14 also is internally threaded to receive one end of a metal pipe 16 that extends downwardly in the canister, its lower end being positioned within the convex portion of the bottom of the canister. There is an axial opening in the bottom of the canister provided with a threaded fixture 23, the latter having a plug 24 threaded thereinto. The arrangement is such that the outlet of the filter may be at the bottom thereof if desired.

The filtering medium within the canister consists of a unit comprising a plurality of filtering elements 18, 18 arranged in a vertical series and separated by interposed layers of comminuted hard wood 19, 19. At each end of the filtering medium is a perforated metal plate 20, and the entire filtering structure is mounted in a fabric casing 21 which is open at the top and does not cover top plate 20. The pipe 16 extends entirely through the filtering unit and projects beyond the bottom thereof, said filtering unit being disposed entirely within the cylindrical portion of the canister.

Each filtering element 18 is composed of matted, long staple, vegetable fibres that have been chemically treated to give them the desired characteristics. For the purpose of this invention it has been found that best results are obtained by use of high grade jute (Corchorus olitorius or C. capsularis), sometimes called "rubbing tow." The jute, which in its natural state is soft, silky, resilient, and loosely matted, is treated in a manner presently to be described, whereby each filament thereof is impregnated with phosphate of iron to render it tough and with black antimony which renders it hard and wiry. The treatment destroys the natural elasticity and resilience of the fibres so that a mass thereof may be closely packed, and thereafter will tenaciously resist separation of its fibres and will not swell under severest service conditions.

The layers of comminuted hard wood 19 between the filtering elements 18 serve the purpose of scattering or disseminating the streams of hot oil passing through the filtering elements so that the full capacity of the latter may be utilized. It has been found that hard maple wood ground to #4 fineness and otherwise untreated is best adapted for the purpose mentioned for the reason that it does not absorb hot oil and will not swell or otherwise be affected thereby.

The fabric casing 21 does not function as a filtering medium, its sole purpose being to prevent the filtering elements 18 from coming into contact with the metal canister where folds of the filtering material might form channels through which the oil could pass without being subject to filtering action. The relatively soft fabric of the casing admits of such intimate contact with the filtering material as effectively to prevent the formation of such channels.

The manufacture of the improved filtering elements from the raw jute is achieved in the following manner: 10 gallons of yellow distilled glycerine is heated to a temperature of 180° F. after which there is added thereto ½ pound of phosphate or iron, $Fe(PO_4)_2$, and four ounces of chloral hydrate, $CCl_3CHO$. The mixture is then brought to a temperature of 240° F. and 2 pounds of black antimony, $Sb_2S_3$, added. This is mixed with 20 gallons of water at a temperature of 200° F. and is then allowed to cool to 180° F. The jute is then immersed in the mixture for sufficient duration of time to become thoroughly impregnated therewith.

The effect of the hot glycerine in the solution is to swell the fibres of the jute and make them porous, flexible and tacky. Thus they are in condition to absorb the phosphate of iron into their structures, which renders them tough and increases their tensile strength. The function of the chloral hydrate is to close the pores of the fibres so that the phosphate of iron is retained or fixed therein. The effect of the black antimony on the fibres is to make them hard and wire-like. The finished product, however, is entirely devoid of resiliency, and may be compacted into a dense mat that tenaciously resists forces tending to effect separation of the fibres.

The filtering elements are capable of resisting the disintegrating effect of hot oil, and achieve the other advantages set out in the foregoing statement of objects.

It will be understood that the term "hard wood" as used herein refers to wood having the physical properties of being hard and close grained, and does not refer to wood from trees of any particular genus or species.

Modifications may be resorted to without departing from the spirit of the invention or the scope of the appended claims, which are not limited wholly to the specific construction shown or exact procedure described.

What is claimed is:

1. A filtering unit comprising a layer of matted vegetable fibres, and a layer of comminuted hard maple wood in juxtaposition therewith so as to be penetrated in succession by the liquid to be filtered.

2. A filtering unit comprising a layer of matted and compacted jute that has been impregnated with phosphate of iron, and a layer of comminuted hard maple wood in juxtaposition therewith so as to be penetrated in succession by the liquid to be filtered.

3. A filtering element consisting of long-staple, vegetable fibres impregnated with phosphate of iron.

4. A filtering element consisting of long-staple, vegetable fibres impregnated with phosphate of iron and black antimony.

5. A filtering element consisting of matted jute, the fibres of which are impregnated with black antimony.

6. The method of making a filtering element which comprises subjecting jute to the action of a softening agent to render the fibres thereof porous and then impregnating the porous fibres with phosphate of iron and black antimony to render them hard and tough.

7. The method of making a filtering element which comprises impregnating jute fibres with phosphate of iron and black antimony in the presence of chloral hydrate.

8. The method of making a filtering element which comprises subjecting jute to the action of glycerine and heat to soften the fibres thereof and then impregnating the porous fibres with phosphate of iron and black antimony.

9. The method of making a filtering element which comprises subjecting jute to the action of phosphate of iron and black antimony in the presence of chloral hydrate and a softening agent to effect impregnation of the jute fibres with the metal salts and thereby to render them hard, wiry and non-resilient.

10. The method of making a filtering element which comprises softening jute fibres with glycerine and heat, and then impregnating them with phosphate of iron and black antimony in the presence of chloral hydrate to render them hard, wiry and non-resilient.

11. The method of making a filtering element which comprises treating jute with an aqueous solution of glycerine, phosphate of iron, chloral hydrate, and black antimony in the presence of heat to effect impregnation of the jute fibres with the metal salts and thereby to render the fibres hard, wiry and non-resilient.

12. The method of making a filtering element which comprises impregnating vegetable fibres with phosphate of iron in the presence of a softening agent and an agent adapted to retain said phosphate of iron within said fibres.

13. The method of making a filtering element which comprises impregnating vegetable fibres with phosphate of iron.

HARVEY D. AUSTIN.